(12) United States Patent
Scanlan et al.

(10) Patent No.: US 7,881,997 B2
(45) Date of Patent: Feb. 1, 2011

(54) SYSTEM AND METHOD FOR QUANTITATIVE PEER TRAVEL AND EXPENSE BENCHMARKING ANALYSIS

(75) Inventors: Toni Elizabeth Scanlan, London (GB); Nhan T. Pham, Stanmore (AU); Srinivas Kumandan, Scottsdale, AZ (US); Jeffrey J. Raible, Glendale, AZ (US); Matthew J. B. Davis, London (GB); Keith R. Janian, Danvers, MA (US); Sivagini Ahamparam, Scottsdale, AZ (US); Lori Jean Cales, Peoria, AZ (US); Orville A. Williams, Glendale, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 777 days.

(21) Appl. No.: 11/261,376

(22) Filed: Oct. 28, 2005

(65) Prior Publication Data
US 2006/0247993 A1 Nov. 2, 2006

Related U.S. Application Data

(60) Provisional application No. 60/676,006, filed on Apr. 29, 2005.

(51) Int. Cl.
*G06Q 40/00* (2006.01)
(52) U.S. Cl. ........................................... 705/35
(58) Field of Classification Search ............ 705/35
See application file for complete search history.

(56) References Cited

U.S. PATENT DOCUMENTS

| | | | |
|---|---|---|---|
| 7,050,986 B1 * | 5/2006 | Vance et al. | 705/5 |
| 2003/0088487 A1 * | 5/2003 | Cheng et al. | 705/30 |
| 2004/0167808 A1 * | 8/2004 | Fredericks et al. | 705/5 |
| 2006/0212321 A1 * | 9/2006 | Vance et al. | 705/5 |
| 2008/0319808 A1 * | 12/2008 | Wofford et al. | 705/6 |

FOREIGN PATENT DOCUMENTS

EP 0 762 306 A2 3/1997

OTHER PUBLICATIONS

International Preliminary Report on Patentability, PCT/US05/03328, dated Oct. 30, 2007.

* cited by examiner

*Primary Examiner*—Jagdish N Patel
*Assistant Examiner*—Kevin Poe
(74) *Attorney, Agent, or Firm*—Snell & Wilmer L.L.P.

(57) ABSTRACT

A system, computer product and method are provided for providing business travel and expense benchmarking analysis. A first data storage receives and stores travel data for peer entities. A second data storage receives and stores expense transaction data for the plurality of peer entities. A data storage server aggregates the metrics of the travel data and the expense transaction data of the plurality of peer entities, generating aggregated travel and expense data. A processor compares a travel and/or expense transaction metric of an individual entity to a corresponding metric of the aggregated travel data and expense transaction data and a communications interface electronically communicates the result of the comparison to a client host computer.

18 Claims, 9 Drawing Sheets

FIG. 3

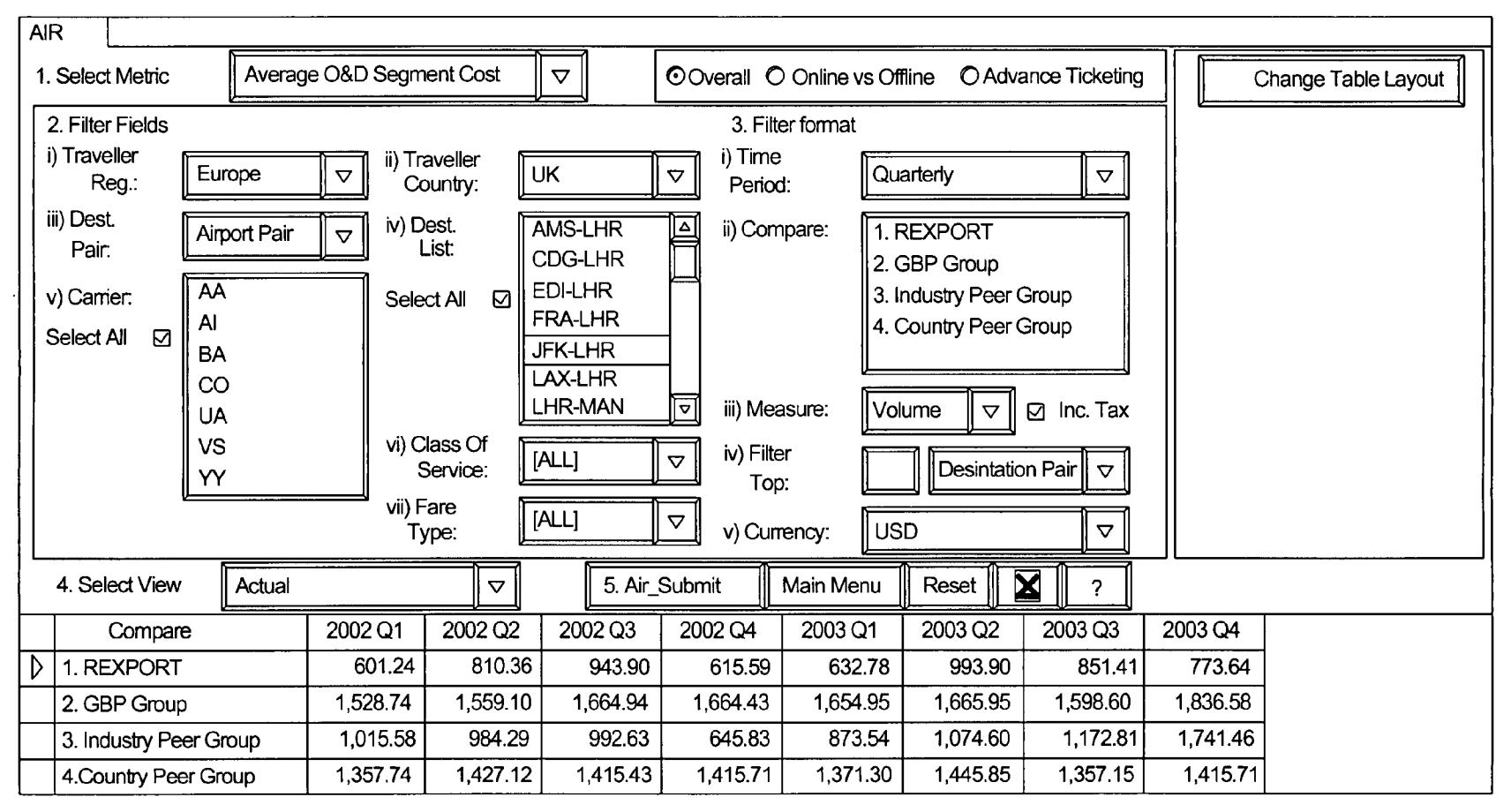

| AIR | | | | | | | | | |
|---|---|---|---|---|---|---|---|---|---|
| 1. Select Metric | Average O&D Segment Cost ▽ | ⊙ Overall ○ Online vs Offline ○ Advance Ticketing | | | | | | | Change Table Layout |
| 2. Filter Fields | | | | | 3. Filter format | | | | |
| i) Traveller Reg.: | Europe ▽ | ii) Traveller Country: | UK ▽ | | i) Time Period: | Quarterly ▽ | | | |
| iii) Dest. Pair: | Airport Pair ▽ | iv) Dest. List: | AMS-LHR<br>CDG-LHR<br>EDI-LHR<br>FRA-LHR<br>JFK-LHR<br>LAX-LHR<br>LHR-MAN | | ii) Compare: | 1. REXPORT<br>2. GBP Group<br>3. Industry Peer Group<br>4. Country Peer Group | | | |
| v) Carrier: | AA<br>AI<br>BA<br>CO<br>UA<br>VS<br>YY | Select All ☑ | | | iii) Measure: | Volume ▽ | ☑ Inc. Tax | | |
| Select All ☑ | | vi) Class Of Service: | [ALL] ▽ | | iv) Filter Top: | | Destination Pair ▽ | | |
| | | vii) Fare Type: | [ALL] ▽ | | v) Currency: | USD ▽ | | | |
| | | | | 5. Air_Submit | Main Menu | Reset | ✖ | ? | |
| 4. Select View | Actual ▽ | | | | | | | | |

| Compare | 2002 Q1 | 2002 Q2 | 2002 Q3 | 2002 Q4 | 2003 Q1 | 2003 Q2 | 2003 Q3 | 2003 Q4 |
|---|---|---|---|---|---|---|---|---|
| △ 1. REXPORT | 601.24 | 810.36 | 943.90 | 615.59 | 632.78 | 993.90 | 851.41 | 773.64 |
| 2. GBP Group | 1,528.74 | 1,559.10 | 1,664.94 | 1,664.43 | 1,654.95 | 1,665.95 | 1,598.60 | 1,836.58 |
| 3. Industry Peer Group | 1,015.58 | 984.29 | 992.63 | 645.83 | 873.54 | 1,074.60 | 1,172.81 | 1,741.46 |
| 4. Country Peer Group | 1,357.74 | 1,427.12 | 1,415.43 | 1,415.71 | 1,371.30 | 1,445.85 | 1,357.15 | 1,415.71 |

FIG. 4

| | | 2002 Q1 | 2002 Q2 | 2002 Q3 | 2002 Q4 | 2003 Q1 | 2003 Q2 | 2003 Q3 | 2003 Q4 |
|---|---|---|---|---|---|---|---|---|---|
| Class | Compare | | | | | | | | |
| Business | 1. REXPORT | 2,522.29 | 1,772.21 | 2,724.85 | 2,002.20 | 2,464.00 | 2,955.13 | 2,730.13 | 2,795.89 |
| Business | 2. GBP Group | 1,772.76 | 1,753.91 | 1,861.37 | 1,831.37 | 1,884.46 | 1,892.06 | 1,832.00 | 2,044.40 |
| Business | 3. Industry Peer Group | 2,693.08 | 2,268.18 | 2,501.71 | 0.00 | 2,350.00 | 2,302.29 | 2,480.08 | 2,785.87 |
| Business | 4. Country Peer Group | 2,056.14 | 1,980.95 | 2,039.33 | 2,073.31 | 2,175.90 | 2,073.83 | 1,959.98 | 2,161.70 |
| Economy | 1. REXPORT | 374.36 | 460.57 | 558.03 | 549.56 | 434.81 | 697.87 | 603.25 | 566.82 |
| Economy | 2. GBP Group | 654.58 | 649.99 | 852.21 | 822.57 | 750.66 | 805.21 | 725.48 | 1,009.82 |
| Economy | 3. Industry Peer Group | 575.03 | 617.46 | 649.01 | 645.83 | 593.53 | 689.11 | 620.86 | 736.72 |
| Economy | 4. Country Peer Group | 547.01 | 521.25 | 644.71 | 825.26 | 715.00 | 777.67 | 704.56 | 757.52 |
| First | 1. REXPORT | 3,943.00 | 2,123.00 | 0.00 | 0.00 | 0.00 | 0.00 | 1,704.00 | 0.00 |
| First | 4. Country Peer Group | 4,527.53 | 3,854.34 | 0.00 | 0.00 | 0.00 | 0.00 | 5,410.54 | 0.00 |

FIG. 5

Corprate card and CPS (Global)     SHARED REPORTS | MY REPORTS | CREATE REPORT | HISTORY LIST | PREFERENCES You are here : Shared Reports > Global benchmarking > Hotel Benchmarking Analysis

Hotel Benchmarking Analysis

▽ Properties   ▽ Filter Details     Last update: 7/19/2004 6:51:57 PM

Business Unit = 999999999:MN-Rexport
And
Year = 2004
And
Currencies = UNITED STATES DOLLAR Page-by ↻ Region: [NORTH AMERICA ▽]   ↻ Market: [USA ▽]   ↻ DI Indicator: [D ▽]   ↻ Hotel Country: [USA ▽]   ↻ Hotel State: [AZ ▽]

↻ Hotel City: [PHOENIX ▽]   ↻ Hotel Name: [MARIOTT SKY HARBOR ▽]   ↻ Hotel Address: [123 SKY HARBOR BLVD ▽]

Paged By: Region: NORTH AMERICA, Market: USA, DI Indicator: D, Hotel Country: USA, Hotel State: AZ, Hotel City: PHOENIX, Hotel Name: MARIOTT SKY HARBOR, Hotel Address: 123 SKY HARBOR BLVD Rows: 3 Columns: 4

| Time ↻ | | 2004 | | |
|---|---|---|---|---|
| Compare△ Metrics ↻ | ▽ Spend | ▽ # Transactions | ▽ Avg Transaction Amount | ▽ Client Count |
| BU-REXPORT | 50 | 5 | 10 | 1 |
| CLIENT GROUP | 30 | 5 | 6 | 5 |
| INDUSTRY PEER GROUP | 25 | 5 | 5 | 6 |

[Help Desk]    [Product Update]

FIG. 6

Corporate Card and CPS (Global)     SHARED REPORTS | MY REPORTS | CREATE REPORT | HISTORY LIST | PREFERENCES You are here : Shared Reports > Global benchmarking > Car Benchmarking Analysis

Car Benchmarking Analysis     Last update: 7/19/2004 7:44:33 PM

▽ Properties   ▽ Filter Details

Business Unit = 999999999:MN-Rexport
And
Year = 2004
And
Currencies = UNITED STATES DOLLAR Page-by ▽ Region: [NORTH AMERICA ▽]   ▽ Market: [USA ▽]   ▽ DI Indicator: [D ▽]   ▽ Car Country: [USA ▽]   ▽ Car State: [AZ ▽]

▽ Car City: [PHOENIX ▽]   ▽ Car Vendor: [HERTZ ▽]

Paged By: Region: NORTH AMERICA, Market: USA, DI Indicator: D, Car Country: USA, Car State: AZ, Car City: PHOENIX, Car Vendor: HERTZ Rows: 3 Columns: 6

| Compare △ | Time ▽ ▲ ▼ Metrics ▽ ▲ ▼ | ▽ Spend | ▽ # Transactions | 2004 ▽ Days Rental | ▽ Avg Transaction Amount | ▽ Avg Daily Rental Rate | ▽ Client Count |
|---|---|---|---|---|---|---|---|
| BU-REXPORT | | 50 | 5 | 6 | 10 | 8 | 1 |
| CLIENT GROUP | | 30 | 5 | 6 | 6 | 5 | 5 |
| INDUSTRY PEER GROUP | | 25 | | 4 | 5 | 6 | 6 |

[Help Desk]    [Product Update]

FIG. 7

Corporate Card and CPS (Global)

SHARED REPORTS | MY REPORTS | CREATE REPORT | HISTORY LIST | PREFERENCES

You are here : Shared Reports > Global benchmarking > Air Benchmarking Analysis

Air Benchmarking Analysis

▽ Properties  △ Filter Details                                             Last update: 7/19/2004 7:50:44 PM

- Hide pivot buttons      Format grid
- Show report detail      Red and Black ▽
- Reset report            ☐ Outline Page-by Region: NORTH AMERICA ▽   Market: USA ▽   DI Indicator: D ▽   O&D Airport Pair: JFK-BCN ▽

O&D City Pair: UNITED STATES-SPAIN ▽   Country Pair: UNITED STATES-SPAIN ▽   Region Pair: NORTH AMERICA-EUROPE ▽

O&D Carrier: AA ▽   O&D Class: ECONOMY ▽   O&D Fare Type: RESTRICTED ▽

Paged By: Region: NORTH AMERICA, Market: USA, DI Indicator: D, O&D Airport Pair: JFK-BCN, O&D City Pair: UNITED STATES-SPAIN, Country Pair:
UNITED STATES-SPAIN, Region Pair: NORTH AMERICA-EUROPE, O&D Carrier: AA, O&D Class: ECONOMY, O&D Fare Type: RESTRICTED Rows: 3 Columns: 6

|  | Time | | | | 2004 | | |
|---|---|---|---|---|---|---|---|
| Compare △ | Metrics | ▽ Spend | ▽ Segments | ▽ Mileage | ▽ Avg O&D Segment Cost | ▽ Avg CPM | ▽ Client Count |
| BU-REXPORT | | 5,620 | 4 | 15,264 | 1,405 | 0 | 4 |
| CLIENT GROUP | | 4,920 | 4 | 15,264 | 1,230 | 0 | 20 |
| INDUSTRY PEER GROUP | | 4,900 | 4 | 15,264 | 1,225 | 0 | 24 |

Help Desk     Product Update

FIG. 8

Corporate Card and CPS (Global) | SHARED REPORTS | MY REPORTS | CREATE REPORT | HISTORY LIST | PREFERENCES You are here : Shared Reports > Global benchmarking > Expense Management Benchmarking Analysis Expense Management Benchmarking Analysis ▷ Properties  ▽ Filter Details                                                    Last update: 7/19/2004 7:54:56 PM Business Unit = 999999999:MN-Rexport
And
Year = 2004

Page-by
[ ] Region: [ NORTH AMERICA ▽ ]  [ ] Market: [ USA ▽ ]  [ ] Industry Type: [ RESTAURANT ▽ ]

Paged By: Region: NORTH AMERICA, Market: USA, Industry Type: RESTAURANT

Rows: 3 Columns: 6

| Time<br>Compare △<br>Metrics | | 2004 | | | | |
|---|---|---|---|---|---|---|
| | ▽ Spend | ▽ # Transactions | ▽ Avg Spend per Card | ▽ Avg Transactions per Card | ▽ Avg Transaction Size per Card | ▽ Client Count |
| BU-REXPORT | 50 | 5 | 10 | 1 | 2 | 1 |
| CLIENT GROUP | 30 | 5 | 6 | 1 | 1 | 5 |
| INDUSTRY PEER GROUP | 25 | 5 | 5 | 1 | 1 | 6 |

[ Help Desk ]  [ Product Update ]

SYSTEM AND METHOD FOR QUANTITATIVE PEER TRAVEL AND EXPENSE BENCHMARKING ANALYSIS

CROSS REFERENCE TO RELATED APPLICATION

This application claims priority to, and the benefit of, U.S. Provisional Patent Application Ser. No. 60/676,006, filed May 20, 2005, which is hereby incorporated by reference in its entirety.

BACKGROUND OF THE INVENTION

1. Field of the Invention

The present invention generally relates to benchmarking reporting tools, and more particularly to benchmarking tools for comparing travel and expense account expenditures against peer groups consisting of comparable businesses.

2. Related Art

Businesses of all sizes want to gain control of travel and expense ("T&E") costs, increase compliance with company policies and government regulations, and save money while doing it. The T&E spending incurred by businesses represents a large opportunity for savings, provided a complete picture of the spending is known. However, identifying practices that will improve corporate T&E processes, procedures, and policies can be expensive and time consuming.

Benchmarking tools allow a business to benefit from a comprehensive understanding of their T&E spending as well as how its spending compares with that of other companies. By customizing their analysis, businesses can further identify areas in which they can improve cost control and use the data to negotiate with suppliers. While some of the databases are consolidated, typically T&E spending data does not come from a single database.

Because data comes from various sources, existing benchmarking tools involve manual research. Using multiple public and private databases, the disparate pools of data on other companies (e.g., peer companies) must be collected and fed to the benchmarking tools. Once the multi-source T&E spending data are consolidated, the data must be processed and presented in a meaningful way in order to provide a complete picture of a business's T&E spending and how it compares against that of its peers.

Given the foregoing, what is needed is a system, method and computer program product for T&E benchmarking which receives data from T&E pools of data and provides comprehensive information and customized data analysis to the end user efficiently.

BRIEF DESCRIPTION OF THE INVENTION

The present invention meets the above-identified needs by providing a system, method and computer program product for performing quantitative peer T&E benchmarking analysis.

In accordance with one embodiment of the present invention, there is provided a system, computer product and method for providing business travel and expense benchmarking analysis. A first data storage receives and stores travel data for peer entities. A second data storage receives and stores expense transaction data for the plurality of peer entities. A data storage server aggregates the metrics of the travel data and the expense transaction data of the plurality of peer entities, generating aggregated travel and expense data. A processor compares a travel and/or expense transaction metric of an individual entity to a corresponding metric of the aggregated travel data and expense transaction data and a communications interface electronically communicates the result of the comparison to a client host computer.

An advantage of the present invention is that it provides a business with a tool which can help it drive down costs by comparing its T&E account spending against peers.

Another advantage of the present invention is that it provides a validation tool which can assist a business in meeting its T&E account spending goals.

Another advantage of the present invention is that it provides quantitative process efficiency data which can be used to determine whether both corporate policies and government regulations are being followed.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIGS. 3-8 are exemplary windows or screen shots generated by the graphical user interface of the present invention.

DETAILED DESCRIPTION

I. Overview

Figure 1:
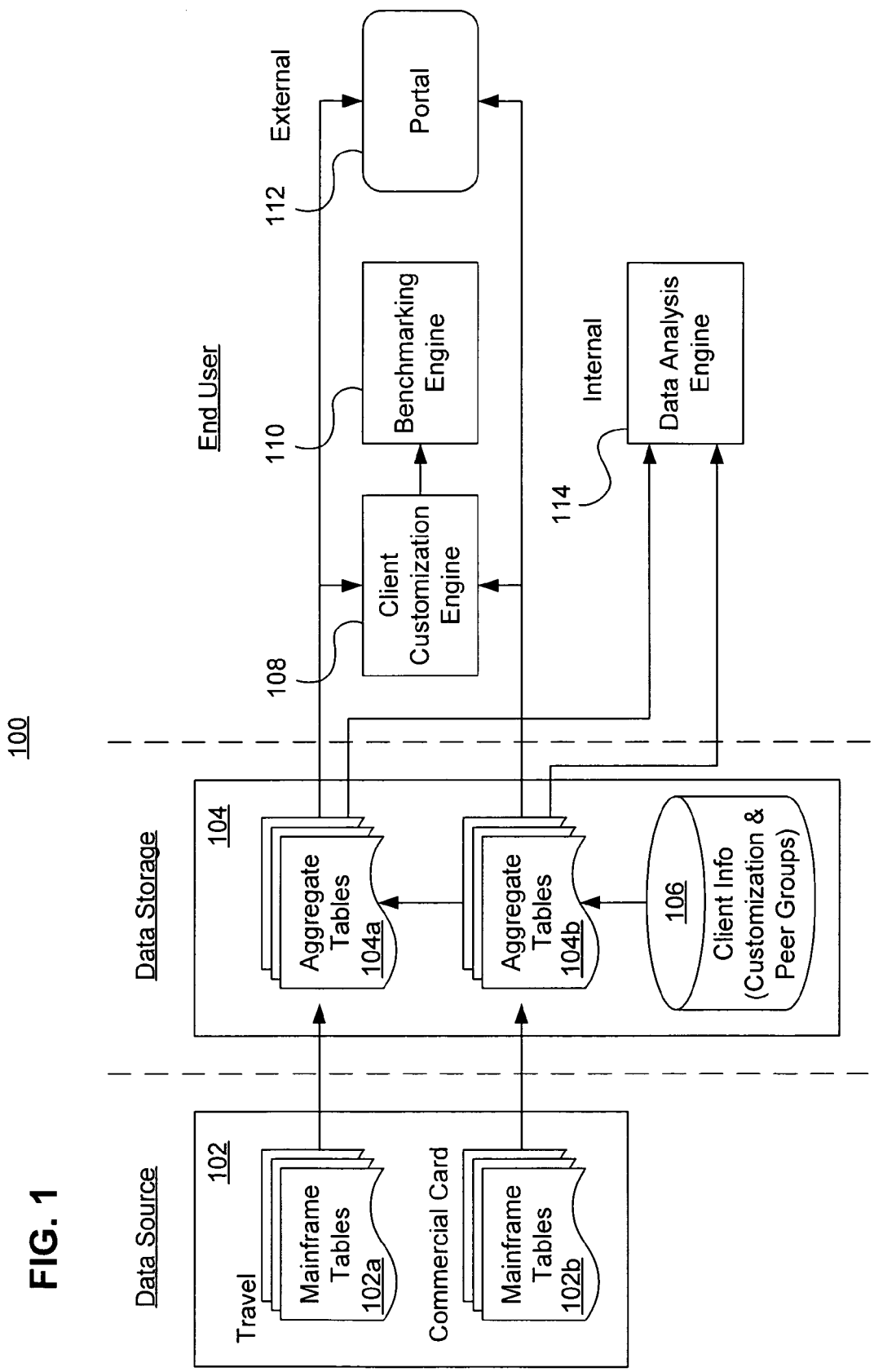
FIG. 1 is a system diagram of an exemplary T&E benchmarking system in accordance with one embodiment of the present invention.

The present invention is directed to a system, method and computer program product for performing quantitative peer travel and expense ("T&E") benchmarking analysis against peer groups.

The present invention is now described in terms of an exemplary T&E benchmarking system in which the present invention, in an embodiment, would be implemented. This is for convenience only and is not intended to limit the application of the present invention. It will be apparent to one skilled in the relevant art(s) how to implement the following invention in alternative embodiments (such as, without limitation, for use with portable handheld devices, personal computers, mobile phones, landline and wireless Internet browsers, access point devices, and the like).

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments up to ten dollars.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

The term "user", "end user", "consumer", "customer", "participant", "owner", "requester" and/or the plural form of these terms are used interchangeably herein to refer to those persons or entities capable of accessing, using, being affected by and/or benefiting from the tool that the present invention provides for benchmarking analysis.

An "account", "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., a rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4N_5N_6N_7N_8N_9N_{10}N_{11}N_{12}N_{13}N_{14}N_{15}N_{16}$

The first five to seven digits are reserved for processing purposes and identify the issuing institution, card type, etc. In this example, the last (sixteenth) digit is typically used as a sum check for the sixteen-digit number. The intermediary eight-to-ten digits are used to uniquely identify the customer, card holder or cardmember.

A merchant account number may be, for example, any number or alpha-numeric characters that identifies a particular merchant for purposes of card acceptance, account reconciliation, reporting and the like.

It should be noted that the transfer of information in accordance with the present invention, may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISO/IEC 7811 standards specify the conditions for conformance, physical characteristics for the card (warpage and surface distortions) and the magnetic stripe area (location, height and surface profile, roughness, adhesion, wear and resistance to chemicals), the signal amplitude performance characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portion of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe format. For example, the counter values, authentication tags and encrypted identifiers, described herein, may be forwarded encoded in all or a portion of a data stream representing data encoded in, for example, track 2 or track 3 format.

II. System

Referring to FIG. 1, a system diagram of an exemplary benchmarking system 100 in which the present invention, in an embodiment, would be implemented is shown. System 100 includes one or more data source servers 102 for receiving T&E data. In particular, two data sources are shown, (1) travel mainframe tables 102a, and (2) transaction account (e.g., commercial card) mainframe tables 102b. Travel data stored in mainframe tables 102a are based on data obtained after travel reservations (e.g., hotel reservations, air reservations, and the like) are booked, whereas expense account data stored in mainframe table 102b are based on data obtained during actual transactions such as when a financial transaction instrument is used to purchase airline tickets.

Differences in the data structures and tables stored in data source mainframe tables 102a and 102b are handled by tailoring an automated extraction, transformation, and loading ("ETL") process to match the different data formats. First, an extract function extracts data from a specified source database (e.g., table 102a or 102b). Next, a transform function converts the extracted data to a desired state. Finally, a load function is used to write the resulting data (either all of the subset or just the changes) in a target database, thereby aggregating the data from various sources. As shown in FIG. 1, travel related (e.g., reservation booking) data are stored in aggregate tables 104a, while commercial card related (e.g., expense transaction) data are stored in aggregate tables 104b. However, in an alternative embodiment, aggregate tables 104a and 104b are combined into combined aggregate T&E table for storing both T&E data.

As a result of the automated ETL process, data extracted from data source mainframe tables 102a and 102b are transformed and aggregated as necessary. Results are aggregated at a client's organizational level for each unique combination of data attributes. For example, results such as the number of transactions and costs are aggregated for data attributes such as merchant, merchant location, transaction type, and the like.

Client information database 106 stores client customization and peer group information. Client customization data include information relating to country-region groupings and reporting year. Peer group data identifies what peer group(s) the client belongs to. Peer group data also include benchmarking data used for comparisons, as described below. Examples of peer groups are industry type (e.g., Technology, Communication, Manufacturing, Professional Services, and the like). Benchmarking data, for example, include volume data (e.g., <$50 MM, $50-100 MM, $100-250 MM, $250 MM+, and the like). Benchmarking reports are filtered, grouped, and formatted based on the client customization and peer group information.

Once the data are stored in aggregate tables 104a and 104b, the present invention feeds the data to an end user. The present invention provides two ways to present the results of the benchmarking analysis to the end user. One way is to provide the user with a benchmarking engine 110 running on an end user client host computer. Benchmarking engine 110 is built using client customization engine 108 (e.g., a Microsoft® Access database) which incorporates the data from the aggregate tables 104a, 104b for a particular end user. Another way to present benchmarking analysis data to the end user is through portal 112. Portal 112 is a Web-based application that provides personalization, sign-on, and content aggregation from different one or more data storage sources and hosts the presentation layer of the benchmarking system in accordance with the present invention.

As shown in FIG. 1, system 100 includes both a benchmarking engine 110 and a portal 112 which communicate with the data storage server 104 through a communications interface. In an alternative embodiment, only benchmarking engine 110 or portal 112 is implemented. Thus, customization can be performed either at a host server computer, a client host computer, or both.

Benchmarking engine 110 performs analysis on the information stored in aggregate tables 104a and 104b on the end user client host. Any client customization occurs in the client customization engine 108. In particular, client customization engine 108 is used to customize a version of benchmarking engine 110 using information from aggregate tables 104a, 104b and client information database 106. Optionally, client data analysis is performed by data analysis engine 114 which operates on both aggregate tables 104a and 104b and client information database 106, allowing users to perform ad hoc queries and analysis.

Client information database 106 contains information identifying end user access and information identifying peer groups information. In the embodiment shown in FIG. 1 benchmarking engine 110 receives data customized for the particular end user from client information database 106 through client customization engine 108.

As described above, portal 112 is a Web-based application hosted by data storage server 104 used to provide interactive Web pages on a client host computer. Portal 112 receives data customized from client information database 106 which is centrally located with the host server.

III. Process

Figure 2:
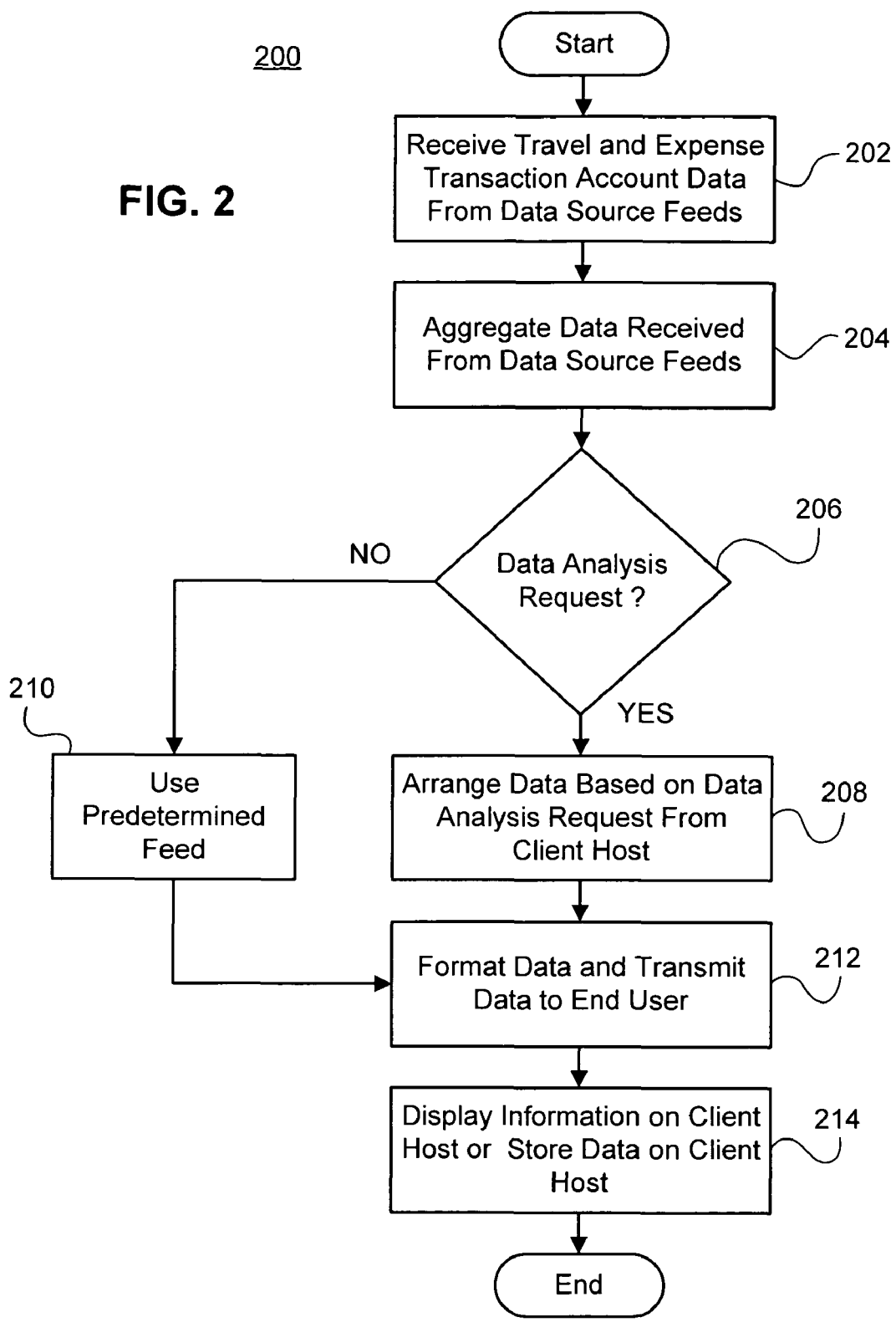
FIG. 2 is a flowchart illustrating a T&E benchmarking process according to one embodiment of the present invention.

Referring to FIG. 2, a flowchart illustrating a T&E benchmarking process 200, according to one embodiment of the present invention, is shown.

Process 200 begins at step 202 which feeds T&E spending data from the disparate data source mainframe tables 102a and 102b into data source server 102. At step 204, data source server 202 feeds data source information in the mainframe tables 102a and 102b to aggregate tables 104a and 104b in data storage server 104 where the data are aggregated. Step 206 determines whether the data from aggregate tables 104a and 104b need to be processed manually before being presented to an end user. If so, at step 208, the data stored in aggregate tables 104a and 104b are arranged in accordance with client information database 106 and delivered using portal 112. Alternatively, after further customization using client customization engine 108, the data are delivered using benchmarking engine 110.

If no manual customization is required then the present invention uses a predetermined set of data and format as shown at step 210. Step 212 feeds the formatted data and transmits it to the end user portal 112. Finally at step 214, the benchmarking information is displayed (or stored) on the end user client host.

The present invention advantageously provides a benchmarking tool for viewing T&E metric data compiled from various data sources simultaneously. For example, credit card transaction data including metric data such as average transaction costs, spend, number of transactions, and the like, and collects this data in relation to final trip costs (e.g., billed data). Changes may occur after the data have been captured.

More recent and accurate data can come from travel reservation data (e.g., from travel booking service), which provide the average daily booked rate, room nights, and booked spend. In some cases transaction account data are unavailable (e.g., because the financial transaction instrument data are not shared by credit card issuer). In such cases other sources of data such as travel reservation data are the only resource for this information. Travel reservation data provide peer carriers, class and fare type even if client has not flown on them. Financial transaction data do not.

A complete picture of T&E data is provided by the present invention because the end user can see not only the booked data through their travel agency but their actual billed charges and what has actually taken place. This is accomplished by aggregating data from various sources. Thus the end user can analyze metric data having a broader coverage in terms of the geography and scope of information without the need to constantly update manually on an ad hoc basis.

In addition, the benchmarking data offer clients several comparative views, including information such as the average of all travel bookings, the average of companies with similar air spending volume, the overall average of companies in similar industries, with further definition by spending level.

IV. Example Implementation

FIG. 3 is an exemplary window or screen shot generated by the user interface of the present invention. In particular, the screen shot illustrates benchmarking analysis of travel account transaction information relating to air travel. A screen shot illustrating expense account transaction information is illustrated below with reference to FIGS. 5-8. These screen shots can be presented to the end user through benchmarking engine 110 or portal 112.

Referring to FIG. 3, the screen shot displays global data available for filtering the data stored in aggregate tables 104*a* and 104*b*. By selecting particular filters, the end user obtains more or less detail of the information being analyzed.

Under the "Select Metric" menu the end user selects the metric data to analyze. Various metrics are listed under this menu, such as average origin and destination segment costs, average cost per mile, class usage, origin and destination pair usage, spend and segment overview, fare type usage, advanced ticketing usage, online versus offline usage, and the like.

Under the heading "Filter Fields," various filters are provided for separating travel transaction account attributes. For example, the "Traveler Region" pull-down menu includes various geographic areas to choose from (e.g., Europe, Japan, Latin or Central America, North America, and the like). A "Destination Pair" filter menu is used to select filtering by country pairs, region pairs, domestic or international, airport pairs, city pairs. For example, if a user filters by "Airport Pairs," then a value corresponding to a pair of airports is selected from the items listed under the "Destination List" pull-down menu. The "Carrier" menu is used to select particular airline carriers for which to filter the information. Alternatively, all of the airline carriers under the "Airline Carrier" can be selected providing no filtering of a particular airline carrier. As shown in the example screen shot depicted in FIG. 3, all of the airline carriers have been selected.

Under the heading "Filter Format" various attributes relating to the presentation formatting are provided. The end user can view a particular time period (e.g., monthly, quarterly, yearly, etc.) using the "Time Period" pull-down menu. A particular peer group to compare against is provided in the "Compare" filter format menu selection. In the example shown in FIG. 3, an individual company ("REXPORT") is compared against a predetermined group of entities ("GBP Group"), an industry peer group of entities ("Industry Peer Group"), and a list of entities throughout the same country ("Country Peer Group"). The currency format is selected using the "Currency" menu. Using the "Measure" menu, the end user chooses measurement scales in which to display the data. For example, the end user can select to view the data in terms of absolute numbers or a percentage change.

Once the parameters have been chosen, the user selects "Air_Submit" to start the analysis. The result of the selections and filters is the table at the bottom of FIG. 3. In the example depicted in FIG. 3, REXPORT is an entity being compared to three peer groups, Global Business Partnership (GBP) Group, Industry Peer Group and Country Peer Group. The GBP is a customized group of businesses against which to compare. Industry Peer Group reflects the particular industry. Country Peer Group is the aggregate of businesses for which travel and card data has been collected, for the particular country in which the user is seeking benchmarking information.

FIG. 4 is an exemplary window or screen shot generated by the graphical user interface of the present invention illustrating drilling down deeper into the underlying data in accordance with one embodiment of the present invention. As shown in FIG. 3, the travel data are compared at a high level, whereas in FIG. 4, the underlying data are shown. In the example illustrated, the particular fare class (e.g., business, coach, etc.) taken by a traveler is analyzed. As the comparison shows, the different groups comprising the total travel expenditures are not all saving as much as their peers.

As explained above, different metric data can be analyzed and the results displayed on benchmarking engine 110 and/or portal 112. The present invention further provides the ability to export the resultant data. In the example shown, the end user has the option of selection a button which exports the data in a format compatible with Microsoft® Excel.

FIGS. 5-8 are exemplary windows or screen shots generated by the graphical user interface of the present invention illustrating different types of benchmarking analysis related to expense transaction account related information in accordance with one embodiment of the invention. In particular, FIG. 5 illustrates hotel benchmarking analysis, FIG. 6 illustrates corporate card and corporate purchasing ("CPS") benchmarking analysis, FIG. 7 illustrates air benchmarking analysis, and FIG. 8 illustrates expense management benchmarking analysis.

Referring to FIG. 5, hotel benchmarking provides information such as average domestic and international booked rates for a business's total lodging expenditure, statistics on top destinations, and the like. Under the heading "Filter details" the user selects the business unit to benchmark. The user also chooses the time period on which to run the report as well as the currency in which to format the data results. The particular groups to be compared against are also selected. Various other attributes become available depending on the type of benchmarking analysis chosen. In the exemplary screen shot illustrated in FIG. 5, such filters separate data such as region, geographic market, hotel country, hotel state, hotel city, hotel name, hotel address, and the like. Next the geography for which to run the report is selected. A particular region or market is also selected. The result of the hotel benchmarking analysis illustrated in FIG. 5 is illustrated at the bottom of the screen which shows the metrics for total spend, number of transactions, average transaction amount and client count. Data can be provided at different time intervals (e.g., quarterly).

FIG. 6 is an exemplary window or screen shot generated by the graphical user interface of the present invention depicting an exemplary car benchmarking analysis in accordance with one embodiment of the present invention. Benchmarking data include information such as average booked rental rates, as well as a breakdown of bookings by car size, and the like. In FIG. 6, the report compares the business entity called "REXPORT" against a predetermined group called "CLIENT GROUP" and an industry peer group "INDUSTRY PEER GROUP" for the year 2004. As stated above, attributes available for filtering the data vary depending on the type of expenditure being analyzed and metrics selected. The present invention advantageously provides for focusing the reports according to the users needs. The particular report shows comparisons between spend, the number of transactions, the average number of days cars were rented, the average transaction amount, the average daily rental rate, and the number of clients the results are based on.

FIG. 7 is an exemplary window or screen shot generated by the graphical user interface of the present invention depicting air benchmarking analysis in accordance with one embodiment of the present invention. Air spend information includes data on domestic point-of-sale average ticket price, average cost per-mile and percentage bookings by cabin class, total bookings, as well as a view of the companies top routes, and the like.

This embodiment is similar to the embodiment illustrated in FIGS. 3 and 4 in that it relates to air travel. However, the underlying data come from a different source. In particular the data come from expense account transaction data feeds (e.g., Mainframe Tables 102*b*). Thus the available metrics for which to analyze the data will complement the data obtained using travel reservation information (e.g., Mainframe Tables 102*a*).

Referring to FIG. 7, the end user has selected to analyze six metrics, including amount spent ("Spend"), segments ("Segments"), mileage between destinations ("Mileage"), average origin and destination segment costs ("Avg O&D Segment Cost"), average cost per thousand impressions ("Avg CPM"), and the total client count on which the information is based ("Client Count"). As shown in FIG. 7, various filter attributes are set to filter and format the data according to end user's needs.

FIG. 8 is an exemplary window or screen shot generated by the graphical user interface of the present invention depicting an expense management benchmarking analysis in accordance with one embodiment of the present invention. Here, all charges by industry types, namely air, car and hotel industry types are analyzed. The exemplary expense management analysis shown in FIG. 8 shows all the industry types at a high level.

The data formatting and filtering processing described above can be performed on data received by the end user client host (e.g., portal 112). Alternatively, a benchmarking analysis request can be prepared on the client host (e.g. portal 112) and transmitted to the data storage server 104, which performs the analysis and returns the results to the portal for display (or download).

Figure 9:
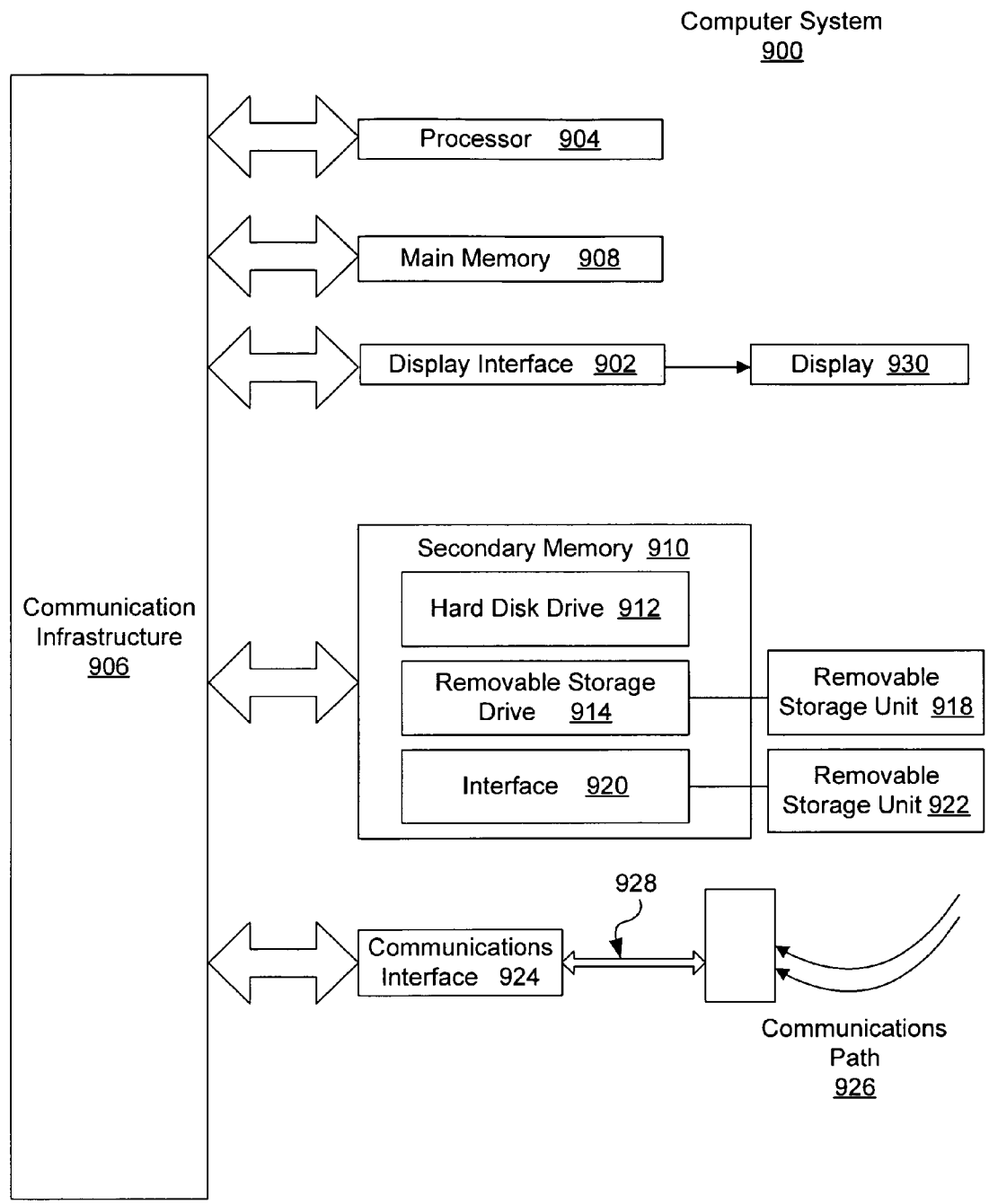
FIG. 9 is a block diagram of an exemplary computer system useful for implementing the present invention.

The present invention (i.e., system 100, process 200, user interfaces depicted in FIGS. 3-8, or any part(s) or function(s) thereof) may be implemented using hardware, software or a combination thereof and may be implemented in one or more computer systems or other processing systems. In one embodiment, the invention is directed toward one or more computer systems capable of carrying out the functionality described herein. An example of a computer system 900 is shown in FIG. 9.

The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on the display unit 930.

Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 914, a hard disk installed in hard disk drive 912, and signals 928. These computer program products provide software to computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the Figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying Figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A system for providing business travel and expense benchmarking analysis to an individual entity, the system comprising:
   first data storage operable to receive and store travel data for a plurality of peer entities;
   second data storage operable to receive and store expense transaction data for the plurality of peer entities;
   a data storage server operable to aggregate a plurality of metrics of the travel data and the expense transaction data of the plurality of peer entities, thereby generating aggregated travel and expense data;
   a processor operable to receive data representing a selection of a first travel metric and to compare at least one of the first travel metric and a corresponding expense transaction metric of the individual entity to a corresponding metric of the aggregated travel data and expense transaction data;
   a benchmarking engine operable to generate benchmarking analysis data and a plurality of comparative views of the benchmarking analysis data based on a result of the comparison by the processor; and
   a communications interface operable to electronically communicate the benchmarking analysis data to a client host computer.

2. The system according to claim 1, further comprising:
   a filter operable to separate data from the result of the comparison.

3. The system according to claim 1, further comprising:
   a client information database in communication with the processor and operable to store client information data comprising customization information for the individual entity, wherein the comparison performed by the processor is determined in accordance with the customization information for the individual entity.

4. The system according to claim 3, further comprising:
   a client customization engine operable to receive and customize the format of the result of the comparison in accordance with the client information data.

5. The system according to claim 1, further comprising:
   a Web server operable to link the result of the comparison from the processor to the client host computer through the communications interface.

6. The system according to claim 1, wherein the first travel metric includes one or more of: average transaction cost, average transaction amount, number of transactions, total spend, mileage between destinations, average cost per thousand impressions, average origin and destination segment cost, average cost per mile, class usage, origin and destination pair usage, spend and segment overview, fare type usage, advanced ticketing usage, and online versus offline usage.

7. A tangible, non-transitory computer-readable storage medium having computer-executable instructions stored thereon that, if executed by a computer based system for providing business travel and expense benchmarking analysis information to an individual entity, cause the computer based system to perform operations comprising:
   receiving, by the computer based system, travel data for a plurality of peer entities;
   receiving, by the computer based system, expense transaction data for the plurality of peer entities;
   aggregating, by the computer based system, a plurality of metrics of the travel data and the expense transaction data of the plurality of peer entities, thereby generating aggregated travel and expense data;
   receiving, by the computer based system, data representing a selection of a first travel metric and to compare at least one of the first travel metric and a corresponding expense transaction metric of the individual entity to a corresponding metric of the aggregated travel data and expense transaction data;
   generating, by the computer based system, benchmarking analysis data and a plurality of comparative views of the benchmarking analysis data based on a result of the comparison by the computer; and
   electronically communicating, by the computer based system, the benchmarking analysis.

8. The tangible non-transitory computer-readable storage medium of claim 7, further comprising filtering, by the computer based system, the result of the comparison.

9. The tangible non-transitory computer-readable storage medium of claim 7, further comprising storing, by the computer based system, client information comprising customization information for the individual entity, wherein the comparison is determined in accordance with the customization information for the individual entity.

10. The tangible non-transitory computer-readable storage medium of claim 9, further comprising customizing, by the computer based system, the format of the result of the comparison in accordance with the client information data.

11. The tangible non-transitory computer-readable storage medium of claim 7, further comprising supplying, by the computer based system, a webpage for displaying the result of the comparison to the client host computer through the communications interface.

12. The tangible non-transitory computer-readable storage medium of claim 7, wherein the first travel metric includes one or more of: average transaction cost, average transaction amount, number of transactions, total spend, mileage between destinations, average cost per thousand impressions, average origin and destination segment cost, average cost per mile, class usage, origin and destination pair usage, spend and segment overview, fare type usage, advanced ticketing usage, and online versus offline usage.

13. A method comprising:
receiving and storing, by a computer based system for providing business travel and expense benchmarking analysis information to an individual entity, travel data for a plurality of peer entities;
receiving, by the computer based system, expense transaction data for the plurality of peer entities;
aggregating, by the computer system, a plurality of metrics of the travel data and the expense transaction data of the plurality of peer entities, thereby generating aggregated travel and expense data;
receiving, by the computer based system, data representing a selection of a first travel metric;
comparing, by the computer based system, at least one of the first travel metric and a corresponding expense transaction metric of the individual entity to a corresponding metric of the aggregated travel data and expense transaction data;
generating, by the computer based system, benchmarking analysis data and a plurality of comparative views of the benchmarking analysis data based on a result of the comparing; and
electronically, by the computer based system, communicating the-benchmarking analysis data.

14. The method according to claim 13, further comprising filtering, by the computer based system, data from the result of the comparing.

15. The method according to claim 13, further comprising storing, by the computer based system, client information data comprising customization information for the individual entity, wherein the comparing is performed in accordance with the customization information for the individual entity.

16. The method according to claim 15, further comprising customizing, by the computer based system, the format of the result of the comparing in accordance with the client information data.

17. The method according to claim 13, further comprising supplying, by the computer based system, a webpage for displaying the result of the comparing to the client host computer through the communications interface.

18. The method according to claim 13, wherein the first travel metric includes one or more of: average transaction cost, average transaction amount, number of transactions, total spend, mileage between destinations, average cost per thousand impressions, average origin and destination segment cost, average cost per mile, class usage, origin and destination pair usage, spend and segment overview, fare type usage, advanced ticketing usage, and online versus offline usage.

* * * * *